United States Patent Office 3,352,938
Patented Nov. 14, 1967

3,352,938
OLEFIN DOUBLE-BOND ISOMERIZATION USING A MIXTURE OF PLATINUM GROUP METALS AS A CATALYST
Larry Plonsker, Royal Oak, and John M. McEuen, Detroit, Mich., assignors to Ethyl Corporation, New York, N.Y., a corporation of Virginia
No Drawing. Filed Dec. 31, 1964, Ser. No. 422,520
9 Claims. (Cl. 260—683.2)

This invention relates to olefin isomerization and more particularly, to the isomerization of straight-chain terminal olefins to straight-chain internal olefins with a mixture of Group VIII metals which exhibits synergism as a catalyst.

Various processes for isomerizing terminal olefins to internal olefins are known in the art. However, in general, the prior art processes suffer from one or more limitations such as excessive olefin cracking, undesirable olefin polymerization, excessive randomization, or unfavorable economics. It is known that palladium and platinum halides in combination with other ingredients can be employed as isomerization catalysts. U.S. Patent No. 2,960,550, Nov. 15, 1960, teaches the isomerization of olefins with a catalytic medium consisting essentially of a halogenated, straight-chain, organic acid solution of a halogen-containing salt of palladium or platinum. U.S. 2,960,551, Nov. 15, 1960, teaches similar catalytic media which consist essentially of a phosphorus oxychloride solution of a halogen-containing palladium or platinum salt. In contrast, this invention comprises the discovery that halide salts of palladium and platinum are unnecessary, and that the isomerization of terminal olefins to internal olefins can take place in the presence of a mixture of Group VIII metals in elemental form. Furthermore, this invention comprises the discovery that halogenated reaction media such as halogenated straight-chain organic acids or phosphorus oxychloride are unnecessary in the isomerization of terminal olefins.

An object of this invention is to provide a process for the isomerization of terminal olefins to internal olefins. A more particular object is to provide a process for the isomerization of straight-chain terminal olefins to straight-chain internal olefins which employs a mixture of Group VIII metals as a catalyst. A further object is to provide an isomerization process which does not entail the use of a halogenated straight-chain organic acid or phosphorus oxychloride as an integral part of a catalytic system. Additional objects will be apparent from the following detailed description and appended claims.

The objects of this invention are satisfied by a process for the isomerization of an olefin which comprises contacting said terminal olefin with a synergistic mixture of Group VIII metals supported on an inert matrix. In a preferred embodiment, a straight-chain terminal olefin having from 4 to 24 carbon atoms is isomerized to a straight-chain internal olefin when the catalyst is selected from such synergistic mixtures as ruthenium-palladium, ruthenium-platinum, ruthenium-rhodium, platinum-palladium, platinum-rhodium, palladium-rhodium, ruthenium-platinum-palladium, ruthenium-platinum-rhodium, and platinum - palladium - rhodium supported on an inert matrix. The preferred mixtures of metals employed in the catalyst are ruthenium-palladium, rhodium-palladium, rhodium-ruthenium, ruthenium-platinum and ruthenium-rhodium-palladium.

The above listed mixtures of metals exhibit a synergistic effect in their catalytic activity of olefin isomerization. It was unexpectedly discovered that the catalytic activity of these mixtures of metals is greater than the catalytic activity of any one metal used alone. Even more unexpectedly, it was discovered that the selectivity of the catalyst containing metal mixtures is substantially greater than the selectivity of the catalysts containing single metals. Thus by employing catalysts containing mixed metals, a higher conversion of olefin-1 to olefin-2 is obtained while the conversion to other undesirable internal olefins and to paraffins is kept to a minimum.

The process of this invention is advantageously employed in the conversion of straight-chain terminal olefins having from 12 to about 24 carbon atoms to the corresponding straight-chain internal olefins. However, the process can be employed to isomerize lower olefins such as butene-1, pentene-1, heptene-1, octene-1, nonene-1, and the like. A particular feature of this invention is the high yield of β-olefin afforded by the process.

The reaction temperature is not critical, and conversions may be carried out at ambient temperatures or higher. However, in some instances the isomerization rate is too slow for practical use when the process is carried out at a temperature below about 100° C. Thus the process is generally carried out at least at 150° C. and preferably at temperatures between about 150° C. and the decomposition temperature of the terminal olefin. A highly preferred reaction temperature is from about 150° to about 225° C. Higher temperatures, however, may also be employed with satisfactory results. Thus higher olefins, such as dodecene-1, tetradecene-1, and hexadecene-1, may be isomerized at the reflux temperature of the system which is higher than 225° C.

Atmospheric pressure, or higher or lower pressures, can be employed. Atmospheric pressure is especially useful in the isomerization of olefins having from 12 to about 24 carbon atoms. In general, a preferred pressure range is from about 1 to about 20 atmospheres; a most preferred range being from 1 to about 5 atmospheres.

The reaction time is not a truly independent variable but is dependent at least to some extent on the other process conditions employed. In general, higher temperatures usually result in a decrease of reaction time. The reaction time is governed at least to some extent by the degree of isomerization desired. Furthermore, the reaction time depends on the amount of the catalyst used for a given volume of an olefin and on the specific metal catalyst mixture employed since some mixtures are more active than others. When carrying out the process as a batch operation, reaction times of from about 10 minutes to about 40 hours are usually sufficient.

As mentioned above, two or more metals, preferably in a finely divided state supported on an inert matrix, are employed as a catalyst in the process of this invention. Preferably, the supports are in finely divided form or in small states of aggregation such as pellets or tablets having a surface of sufficient area to give an effective catalytic surface. Any inert catalytic support known in the catalytic art can be employed. Preferably, the support is selected from the class consisting of charcoal, alumina, diatomaceous earth, bentonite, firebrick, kaolin, ground glass, silicon carbide, silicon dioxide, kieselguhr, and zeolites. The zeolites are a group hydrated aluminum and calcium or sodium silicates capable of reaction in solution by double decomposition with salts of the alkali and alkaline earth metals. They are of the general type $$Na_2O \cdot 2Al_2O_3 \cdot 5SiO_2$$

and $CaO \cdot 2Al_2O_3 \cdot 5SiO_2$.

| | |
|---|---|
| Analcine | $NaAlSi_2O_6(H_2O)$ |
| Chabazite | 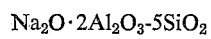 |
| Heulandite | $CaAl_2Si_6O_{16}(H_2O)_5$ |
| Natrolite | $Na_2Al_2Si_3O_{10}(H_2O)_2$ |
| Stilbite | $CaAl_2Si_6O_{16}(H_2O)_6$ |
| Thomsonite | $(Ca,Na_2)Al_2Si_2O_8(H_2O)_2$ |

Charcoal, and particularly finely divided charcoal, is the most highly preferred inert support.

The catalyst preferably consists of from one to about 10 weight percent of finely divided metals dispersed on an inert support of about 90 to about 99 weight percent. It should be noted that both the metals and the inert supports can be in other states of aggregation such as pellets or tablets; but finely subdivided material is preferred because it provides larger surface area and thus increases the efficiency of the catalyst. When a catalyst is too active, however, it might be preferable to employ the metals and/or the inert material that is in larger particle size.

The amount of catalyst employed in this process is not critical. However, it is preferred that an amount of catalyst be used which affords a resonable amount of isomerization in a reasonable reaction time. In general, when the process of this invention is carried out as a batch operation, from about 0.01 to about 40 weight percent of a catalyst consisting of a metal mixture and an inert support is employed. A preferred range is from about one to about 15 weight percent. Thus, for example, if 100 grams of olefin is charged to the reaction vessel, it is highly preferred that from about one to about 15 grams of a catalyst mixture, that is, a mixture of the metals and the inert support, be admixed therewith.

The process of this invention can be carried out as a batch process or as a continuous operation. In a continuous process, an olefin, either in vapor or in liquid phase, may be contacted with the catalyst, but for practical reasons, liquid phase operations are preferred. When carrying out the process of this invention as a batch operation, it is preferred that a liquid phase be present. Thus, dodecene-1 can be isomerized by refluxing a mixture of dodecene-1 and a catalyst at atmospheric pressure. Similarly, butene-1 can be isomerized in a batch operation by contacting it with a catalyst at a pressure under which the terminal olefin is a liquid. Alternatively, butene-1 (or any terminal olefin that is gaseous at the reaction temperature) can be isomerized according to the process of this invention by bubbling the gaseous olefin through a liquid reaction medium in contact with the catalyst.

A very important feature of this invention is the fact that the catalyst employed in this process may be re-used for subsequent isomerizations and, thus, improve the economics of the process. When the process of this invention is carried out as a batch operation, the catalyst may lose some activity after about five runs, however.

Although this process can be conducted in the presence of a solvent, we prefer not to employ a solvent when isomerizing an alpha olefin which is in the liquid state under the reaction conditions employed.

Those solvents which may be employed should be inert under the reaction conditions. Non-aqueous materials such as the saturated hydrocarbons, e.g., pentane, hexane, isopentane, dodecane, and the like are preferred, but ethers and halogenated hydrocarbons may also be used.

The processes of this invention may be carried out either in air or in an inert atmosphere. When an inert atmosphere is desired, nitrogen is preferred, mainly for economical reasons. However, other inert gases may be used with equal success. When this invention is carried out as a continuous process, an inert gas, preferably nitrogen, is advantageously used as a carrier for the olefin that is being passed through the catalyst bed. In such a process, the amount of nitrogen used is measured by cubic centimeters (cc.), passed through the reaction tube per minute. It is preferred that the nitrogen flow be such that the ratio of the volume of nitrogen to the volume of olefin be from 1:1 to 1000:1.

When the process of this invention is a continuous process, an additional variable of space velocity is introduced. Space velocity may be defined by the following relationship:

$$\text{Space velocity (s.v.)} = \frac{\text{ml. olefin injected/ml. catalyst}}{\text{hours}}$$

The above formula for calculating space velocity holds whether the olefin employed is in liquid or gas phase. The value for space velocity, however, will be substantially different when the olefin is in one or the other physical state. For example, when the olefin is in a liquid state, space velocity generally is in the range of from 0.1 to about 100, and more preferably, from 0.5 to about 10. On the other hand, when the olefin is in a gaseous state, space velocity is in the range of from about 50 to about 500. The reason for the difference in the values for space velocity is that there is substantially much less olefin in each milliliter of olefin in gaseous state than in each milliliter of olefin in a liquid state.

Space velocity is thus a measure of the speed with which an olefin is passed through the reaction tube containing the catalyst bed. Space velocity in a continuous process, similarly as the reaction time in a batch process, is not a directly independent variable. It depends on the reaction temperature, the activity of a particular catalyst employed, and the degree of isomerization desired. It will be seen then that in order to achieve a given amount of isomerization, the space velocity generally will be different for different catalysts even if all other variables remain constant.

From the above discussion, it is clear that the space velocity and the nitrogen flow must be determined for every isomerization when a different catalyst or a different olefin is employed. Not only the activity of the catalyst and the reaction temperature must be considered, but also the degree of isomerization desired, since, generally, the higher the degree of isomerization, the more time is required to attain it. Generally speaking, however, space velocity for liquid olefins will be in the range of from 0.1 to about 100, and preferably from 0.5 to about 10, and for gaseous olefins from about 50 to about 500. In Example 26, where 1% ruthenium and 9% palladium was employed as the mixture of metals, said mixture being dispersed on powdered charcoal, space velocity of 1.5 was used. The rate of the nitrogen flow often will have a great effect on the degree of isomerization, as indicated by Examples 26 and 27.

In a continuous process, occasionally a single pass of an olefin through the reaction column might not yield the desired degree of isomerization. In such cases, the partially isomerized olefin may be recycled in the same manner as the fresh olefin through the reaction column to produce the desired degree of isomerization.

The products of this invention can be separated from the reaction mixture by any method known in the art. Suitable separation techniques include filtration, distillation, decantation, chromatography, and the like.

The following examples serve to illustrate this invention, but do not limit it. All parts are by weight uness otherwise indicated.

EXPERIMENTAL

*Example 1.—Batch isomerization*

A flask equipped with a side arm fitted with a diaphragm was charged with 18 parts of dodecene-1 and 2 parts of a catalyst consisting of 9 wt. percent of 5% palladium on charcoal and 1 wt. percent of 5% ruthenium on charcoal. The flask was swept with nitrogen and the reaction mixture was heated to reflux for 8 hours while stirring. The reaction mixture was then filtered to remove the catalyst and the isomerized olefin was determined by infrared and vapor phase chromatography analysis to contain 79% dodecene-2.

Examples 2–26 are contained in Table 1 and in all of these examples the procedure described in Example 1 was followed changing only the catalysts used and their amounts, the temperature, and the reaction time as indicated in the table.

In the following table, percent Ru/C indicates percent ruthenium (or another metal as indicated) dispersed on charcoal. In all the examples in the table, the catalyst in column 3 used in the amounts specified in column 5 were 5% by weight of indicated mixture of metals dispersed on powdered charcoal.

much better results than ruthenium, the amount of paraffin, unisomerized 1-olefin, and internal olefins is somewhat high. The mixture of ruthenium on charcoal and palladium on charcoal, however, produces the highest per-

TABLE 1

| Example Number | Olefin | Catalyst Composition, wt. Percent $M_1/C$:wt. Percent $M_2/C$ | Ratio of Metal$_1$:Metal$_2$ | Weight Percent Catalyst | Temperature | Time, hrs. | Product and Percent 2-olefin in the Final Product |
|---|---|---|---|---|---|---|---|
| 2 | Dodecene-1 | 0.5% Ru/C:5% Pd/C | 1:10 | 5.5 | Reflux | 22 | Dodecene-2 (77%). |
| 3 | ----do---- | 1% Ru/C:5% Pd/C | 1:5 | 6 | ----do---- | 4 | Dodecene-2 (76%). |
| 4 | ----do---- | 1% Ru/C:9% Pd/C | 1:9 | 10 | ----do---- | 8 | Dodecene-2 (81%). |
| 5 | ----do---- | 5% Ru/C:5% Pd/C | 1:1 | 10 | ----do---- | 1 | Dodecene-2 (55%). |
| 6 | ----do---- | 1% Ru/C:7.5% Pd/C | 1:7.5 | 8.5 | ----do---- | 8 | Dodecene-2 (76%). |
| 7 | ----do---- | 1% Rh/C:9% Pd/C | 1:9 | 10 | ----do---- | 1 | Dodecene-2 (73%). |
| 8 | ----do---- | 1% Rh/C:9% Pd/C | 1:9 | 10 | 150° C | 3 | Dodecene-2 (83%). |
| 9 | ----do---- | 2.5% Rh/C:2.5% Ru/C | 1:1 | 5 | 150° C | 8 | Dodecene-2 (62%). |
| 10 | ----do---- | 2.5% Rh/C:2.5% Ru/C | 1:1 | 5 | Reflux | 2 | Dodecene-2 (71%). |
| 11 | ----do---- | 0.5% Rh/C:0.5% Ru/C | 1:1 | 1 | ----do---- | 8 | Dodecene-2 (69%). |
| 12 | ----do---- | 2% Ru/C:8% Pt/C | 1:4 | 10 | ----do---- | 8 | Dodecene-2 (62%). |
| 13 | ----do---- | 3% Ru/C:7% Pt/C | 3:7 | 10 | ----do---- | 7 | Dodecene-2 (56%). |
| 14 | ----do---- | 5% Ru/C:5% Pt/C | 1:1 | 10 | ----do---- | 4 | Dodecene-2 (68%). |
| 15 | ----do---- | 0.5% Rh/C:0.5% Ru/C:9% Pd/C | | 10 | ----do---- | 1 | Dodecene-2 (80%). |
| 16 | Tetradecene-1 | 7.5% Ru/C:2.5% Rh/C | 3:1 | 10 | 100° C | 10 | Oetradecene-2. |
| 17 | Hexadecene-1 | 7.5% Ru/C:2.5% Rh/C | 3:1 | 10 | 225° C | 10 | Hexadecene-2. |
| 18 | Hexene-1 | 0.1% Ru/C:10% Rh/C | 1:100 | 5 | 65° C | 2 | Hexene-2. |
| 19 | ----do---- | 0.1% Ru/C:5% Pd/C | 1:50 | 10 | 65° C | 8 | Do. |
| 20 | Tetraeicosene-1 | 3% Rh/C:7% Pd/C | 3:7 | 10 | 300° C | 20 | Tetraeicosene-2. |
| 21 | Eicosene-1 | 5% Rh/C:5% Pd/C | 1:1 | 10 | 275° C | 12 | Eicosene-2. |
| 22 | Octadecene-1 | 5% Rh/C:5% Pd/C | 1:1 | 10 | 250° C | 10 | Octadecene-2. |
| 23 | Decene-1 | 5% Rh/C:5% Ru/C | 1:1 | 10 | 175° C | 4 | Decene-2. |
| 24 | 5-methyldodecene-1 | 1% Ru/C:5% Pd/C | 1:5 | 6 | Reflux | 4 | 5-methyldodecene-2. |
| 25 | 2-methyldodecene-1 | 5% Ru/C:5% Pd/C | 1:1 | 10 | ----do---- | 1 | 2-methyldodecene-2. |

Examples 1, 6, 9, 11, 15 and 16 were repeated following the same procedure except that the metal content of the catalyst was changed from 5% metal on charcoal to 0.1%, 1%, 10%, 15% and 20% of a metal on charcoal. Results comparable to those in Table 1 were obtained.

As stated above, the mixed metal catalyst of this invention exhibit synergistic effect in the olefin isomerization reactions. The synergism is exhibited primarily by improving the ability to control the reaction; that is, by minimizing the formation of undesirable products such as paraffins and internal olefins, and improving the conversion of 1-olefin to the desired 2-olefin. At the same time, the activity of the catalyst is controlled so that any additional contact between the isomerized olefin and the catalyst will not cause the product to isomerize further to internal olefins. This is of utmost importance in a commercial operation since it is often difficult to stop the reaction at the most ideal time. The above noted advantages of the catalysts of this invention are illustrated by the following examples.

centage of the 2-olefin and, at the same time, the lowest percentage of undesirable internal olefins and strikes a happy medium between ruthenium and palladium with respect to the amount of paraffins and unisomerized 1-olefins in the product. An even more striking example of synergistic effect is shown below when rhodium and palladium are employed.

ISOMERIZATION OF DODECENE-1

| Catalyst | Wt. percent of Catalyst | Temp. | Time, hrs. | Paraf. | 1-olefin | 2-olefin | Internal olefins |
|---|---|---|---|---|---|---|---|
| 5% Rh/C | 1% | 150° C | 8 | 0.5% | 77.0% | 21.5% | 1.0% |
| 5% Pd/C | 10% | 150° C | 4 | 3.2% | 19.5% | 60.5% | 16.8% |
| 5% Rh/C: 5% Pd/C | {1%}10% {9%} | 150° C | 3 | 0.7% | 8.6% | 83.1% | 8.1% |

Here, although rhodium requires a comparatively long time for isomerizing 1-olefin to 2-olefin and palladium gives rather high amounts of 1-olefin and internal olefins in the product, the mixture of rhodium on charcoal and palladium on charcoal yields a strikingly high percentage of 2-olefin and at the same time, low percentages of paraffin, 1-olefin and internal olefins.

*Example 26.—Continuous isomerization*

The isomerization by a continuous process was carried out in a tube equipped with thermocouples and two heaters. The thermocouples were for the purpose of measuring the temperature at various locations in the

ISOMERIZATION OF DODECENE-1

| Catalyst | Wt. percent of Catalyst | Temp. | Time, hrs. | Paraf. | 1-olefin | 2-olefin | Internal olefins |
|---|---|---|---|---|---|---|---|
| 5% Ru/C | 1% | Reflux | 0.25 | 0.6% | 4.1% | 69.4% | 25.9% |
| 5% Pd/C | 10% | ---do--- | 6 | 4.2% | 10.1% | 73.2% | 12.5% |
| 5% Ru/C: 5% Pd/C | {1%}10% {9%} | ---do--- | 8 | 3.1% | 8.6% | 79.2% | 9.1% |

As may be seen, ruthenium on charcoal is very active since in only 15 minutes, the isomerization yields a large amount of internal olefins, although paraffin content and unisomerized 1-olefin are desirably low. Although, as indicated by the above data, palladium on charcoal gives tube and the two heaters were arranged in such a manner that one served as a pre-heater and the other as a main heater located in the area of the catalyst bed. The temperatures were regulated by a temperature regulating means such as a Gardsman Controller. Part of the tube was packed with the catalyst consisting of a powdered charcoal containing 1% ruthenium and 9% palladium. Below and above the catalyst were placed glass beads to facilitate better mixing of the olefin with the catalyst.

The average temperature in the pre-heat area was about 192° C. and the average temperature in the center of the catalyst bed was about 193° C. About 31 parts of dodecene-1 were injected into the column by a Continuously Variable Syringe Pump at a space velocity of 1.5 and a nitrogen flow of about 100 cc./minute, measured by a Manometer Flow Meter. The isomerized dodecene-1 was condensed in a receiver, cooled in an ice bath. The product contained 45.8% dodecene-2 (73% yield, 63% conversion).

*Example 27*

Example 26 was repeated changing only the pre-heat temperature from 192° C. to 204° C. and the nitrogen flow from 100 cc./minute to 10 cc./minute. The product contained 63% dodecene-2 (72% yield, 88% conversion).

Examples 26 and 27 were repeated using other olefins such as decene-1, tetradecene-1, and hexadecene-1 and catalysts such as rhodium-palladium, rhodium-ruthenium, ruthenium-palladium and ruthenium-rhodium-palladium supported on charcoal, powdered and pelleted, alumina and silica on alumina. In these isomerizations, results comparable to those in Examples 26 and 27 were obtained.

The internal olefins produced by the process of this invention are well known compounds and have the many utilities which are known for them. For example, they are valuable chemical intermediates and can be transformed into acids by an ozonolysis reaction. Thus, for example, tetradecene-2 can be reacted with ozone to yield lauric acid, a detergent range acid. Similarly, the other internal olefins produced by this process can be ozonized to yield the corresponding acids. When ozonizing the products of the process of this invention, the reaction is generally carried out at a low temperature; e.g., from −50 to about 10° C. After the ozonization reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

Having fully described the process of this invention, the products produced thereby and their many utilities, it is desired that this invention be limited only by the lawful scope of the appended claims.

We claim:

1. A process for the preparation of a straight-chain β-olefin having from 4 to about 24 carbon atoms from the corresponding straight-chain α-olefin, said process comprising contacting said α-olefin with from about 5 to about 10 weight percent of an isomerization catalyst containing about 5 weight percent of a ruthenium-palladium mixture, said mixture consisting substantially of 1 part ruthenium and from about 5 to about 10 parts of palladium dispersed on a finely divided activated charcoal, said process being carried out at atmospheric pressure in an inert atmosphere and at about the reflux temperature of the system.

2. The process of claim 1 wherein said mixture consists substantially of 1 part ruthenium and 7½ parts palladium.

3. The process of claim 1 wherein said mixture consists substantially of 1 part ruthenium and 5 parts palladium.

4. A process for the preparation of a straight-chain β-olefin having 4 to about 24 carbon atoms from the corresponding straight-chain α-olefin, said process comprising contacting said α-olefin with about 10 weight percent of an isomerization catalyst containing about 5 weight percent of a rhodium-palladium mixture, said mixture containing about 1 part rhodium and about 10 parts palladium dispersed on a finely divided activated charcoal, said process being carried out at substantially atmospheric pressure, in an inert atmosphere, and at about the reflux temperature of the system.

5. A process for the preparation of tetradecene-2 from tetradecene-1, said process comprising contacting tetradecene-1 with about 10 weight percent of an isomerization catalyst consisting essentially of about 5 weight percent of ruthenium-palladium mixture, said mixture consisting substantially of one part ruthenium and 9 parts palladium dispersed on a finely divided activated charcoal, said process being carried out at atmospheric pressure in an inert atmosphere and at the reflux temperature of the system, such that the concentration of the catalyst in the reaction mixture is about 10 weight percent.

6. A process for the preparation of hexadecene-2 from hexadecene-1, said process comprising contacting hexadecene-1 with about 10 weight percent of an isomerization catalyst consisting essentially of about 5 weight percent of ruthenium-palladium mixture, said mixture consisting substantially of one part ruthenium and 9 parts palladium dispersed on a finely divided activated charcoal, said process being carried out at atmospheric pressure in an inert atmosphere and at the reflux temperature of the system, such that the concentration of the catalyst in the reaction mixture is about 10 weight percent.

7. A process for the preparation of dodecene-2 from dodecene-1, said process comprising contacting dodecene-1 with about 10 weight percent of an isomerization catalyst containing about 5 weight percent of ruthenium-palladium mixture, said mixture consisting substantially of one part ruthenium and 9 parts palladium dispersed on a finely divided activated charcoal, said process being carried out at atmospheric pressure in an inert atmosphere and at the reflux temperature of the system; such that the concentration of the catalyst in the reaction mixture is about 10 weight percent.

8. The process of claim 7 wherein said catalyst contains a rhodium-palladium mixture.

9. The process of claim 7 wherein said catalyst contains about 5 weight percent of a rhodium-palladium mixture, said mixture consisting substantially of 1 part rhodium and 9 parts palladium dispersed on finely divided, activated charcoal.

References Cited

UNITED STATES PATENTS

| 3,182,097 | 5/1965 | Brennan et al. | 260—683.65 X |
| 3,205,282 | 9/1965 | Sparke et al. | 260—683.2 |
| 3,214,487 | 10/1965 | Mattox | 260—683.2 |
| 3,248,448 | 4/1966 | Goble et al. | 260—683.2 |
| 3,248,450 | 4/1966 | Goble | 260—683.2 |

FOREIGN PATENTS 448,177    4/1948    Canada.

DELBERT E. GANTZ, *Primary Examiner.*

R. H. SHUBERT, *Assistant Examiner.*